(12) United States Patent
Lee

(10) Patent No.: US 6,600,276 B2
(45) Date of Patent: Jul. 29, 2003

(54) AUTOMATIC CONVERGENCE CONTROL METHOD AND APPARATUS FOR PROJECTION TELEVISION

(75) Inventor: Suk-sun Lee, Anyang-si (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/133,439

(22) Filed: Apr. 29, 2002

(65) Prior Publication Data

US 2003/0057892 A1 Mar. 27, 2003

(30) Foreign Application Priority Data

Sep. 10, 2001 (KR) .......................... 2001-55555

(51) Int. Cl.$^7$ ................................. G09G 1/28
(52) U.S. Cl. .................. 315/368.11; 348/807; 348/806
(58) Field of Search .................... 315/368.11, 368.24, 315/11.5, 364, 386; 313/409, 412, 426; 348/805, 806, 807, 746

(56) References Cited

U.S. PATENT DOCUMENTS

| | | | | |
|---|---|---|---|---|
| 4,593,308 A | * | 6/1986 | Kemplin | 315/11.5 |
| 4,857,998 A | * | 8/1989 | Tsujihara et al. | 348/747 |
| 4,896,081 A | * | 1/1990 | Ichigaya et al. | 348/807 |
| 5,298,985 A | * | 3/1994 | Tsujihara et al. | 315/368.11 |
| 5,898,465 A | * | 4/1999 | Kawashima et al. | 348/807 |
| 6,333,768 B1 | * | 12/2001 | Kawashima et al. | 315/368.11 |

* cited by examiner

*Primary Examiner*—Don Wong
*Assistant Examiner*—Ephrem Alemu
(74) *Attorney, Agent, or Firm*—Sughrue Mion, PLLC

(57) ABSTRACT

A convergence control method and apparatus for a projection television are provided. The convergence control apparatus includes an image signal decoder, a convergence control unit, and a main microcomputer. The image signal decoder processes an input image signal and generates a data signal and horizontal and vertical synchronization signals, and a start signal indicating the start of either the horizontal and vertical synchronization signals. The convergence control unit performs convergence adjustment according to a convergence control command it receives, and generates a completion signal when convergence adjustment is complete. The main microcomputer inputs the convergence control command to the convergence control unit when the start signal is input from the image signal decoder, and performs a control operation to display the image signal when the completion signal is input from the convergence control unit.

5 Claims, 3 Drawing Sheets

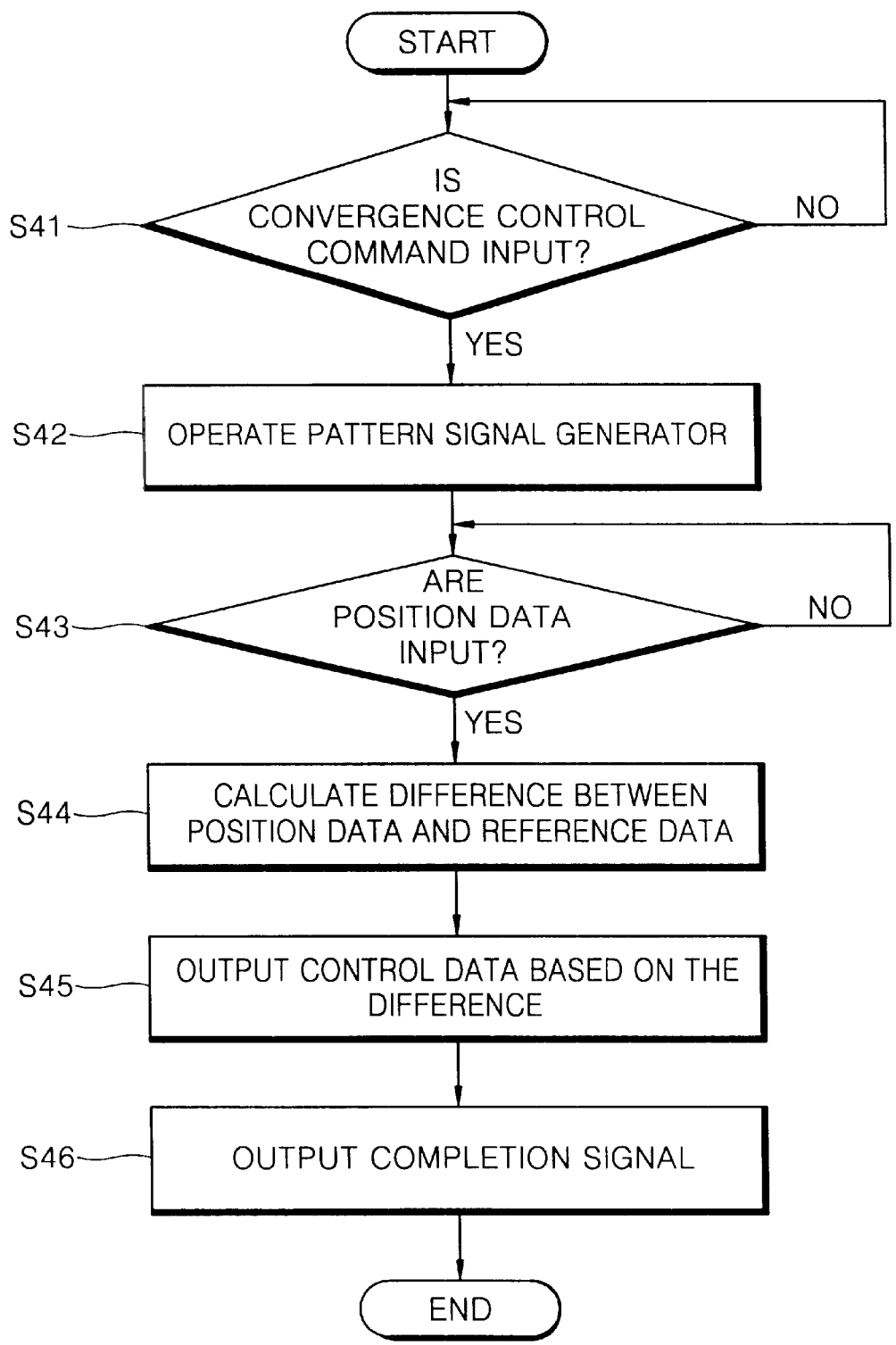

AUTOMATIC CONVERGENCE CONTROL METHOD AND APPARATUS FOR PROJECTION TELEVISION

BACKGROUND OF THE INVENTION

1. Field of the Invention

The present invention relates to a control method and apparatus for convergence of a projection television, and more particularly, to a convergence control method and apparatus for a projection television which magnifies images displayed on three cathode ray tubes for the colors red, green, and blue with lenses and projects the images onto a screen. The present application is based on Korean Application No. 2001-55555, filed Sep. 10, 2001, which is incorporated herein by reference.

2. Description of the Related Art

In a projection television, three images from the red, green, and blue cathode ray tubes and lenses are projected onto a screen such that they overlap. The degree to which the images overlap on the screen is expressed by the term "convergence". A displacement between the three images is called a "misconvergence". The earth's magnetic field near the projection television may be a main cause of the misconvergence. The convergence of a projection television can be adjusted at any time.

When a conventional projection television operates in a convergence adjustment mode in response to a user's command, a normal display mode is interrupted. For example, a user adjusts the convergence of the projection television by manipulating a convergence adjustment button on a remote controller or a user control board attached to a television receiver. This method of convergence adjustment in a projection television is disclosed in U.S. Pat. No. 4,951,131.

The conventional convergence adjustment is conducted by pressing a convergence adjustment button based on a decision made by the user to adjust the convergence and causes the following problems.

First, it is difficult for an inexperienced user to make a correct decision as to when he/she should adjust the convergence, so lower quality pictures may be viewed by the inexperienced user.

Second, it is inconvenient to perform a manual convergence adjustment performed based on a decision made by a user whenever the picture quality is deteriorated due to the earth's magnetic field.

Third, normal picture display is interrupted for a few seconds or a few minutes while the convergence adjustment is made.

SUMMARY OF THE INVENTION

To solve the above-described problems, it is an object of the present invention to provide an automatic convergence control method and apparatus for a projection television, in which a user's viewing of the projection television is not interrupted for convergence adjustment.

To achieve the object of the present invention, there is provided a convergence control method for a projection television which magnifies images displayed on cathode ray tubes (CRTs) for the colors red, green, and blue with lenses and projects the images onto a screen, the method involving, when a power voltage is applied to the projection television, detecting the start of a synchronization signal of an input image signal. When the start of the synchronization signal of the image signal is detected, a predetermined convergence control pattern signal is generated. Next, the convergence of the projection television is adjusted according to the predetermined convergence control pattern signal. After convergence adjustment is complete, the image signal is displayed.

In the automatic convergence control method according to the present invention, convergence adjustment can be automatically conducted by detecting the start of a synchronization signal of an input image signal. Accordingly, it is unnecessary for a user to adjust the convergence of a projection television while watching the television.

The object of the present invention is also achieved by a convergence control apparatus for a projection television which magnifies images displayed on CRTs for the colors red, green, and blue with lenses and projects the images onto a screen, the apparatus comprising an image signal decoder, a convergence control unit, and a main microcomputer. The image signal decoder processes an input image signal and generates a data signal and horizontal and vertical synchronization signals, and a start signal indicating the start of either the horizontal and vertical synchronization signals. The convergence control unit performs convergence adjustment according to a convergence control command it receives, and generates a completion signal when convergence adjustment is complete. The main microcomputer inputs the convergence control command to the convergence control unit when the start signal is input from the image signal decoder, and performs a control operation to display the image signal when the completion signal is input from the convergence control unit.

In the automatic convergence control apparatus according to the present invention, upon receipt of an image signal, a start signal is generated by the image signal decoder, and a convergence control command is transmitted to the convergence control circuit from the main microcomputer in response to the start signal. Accordingly, there is no need for a user to adjust the convergence of a projection television while watching the television.

BRIEF DESCRIPTION OF THE DRAWINGS

The above object and advantages of the present invention will become more apparent by describing in detail preferred embodiments thereof with reference to the attached drawings in which:

FIG. 4 is a flowchart illustrating the key algorithm of a convergence microcomputer of the projection television of FIG. 1.

DETAILED DESCRIPTION OF THE INVENTION

Figure 1:
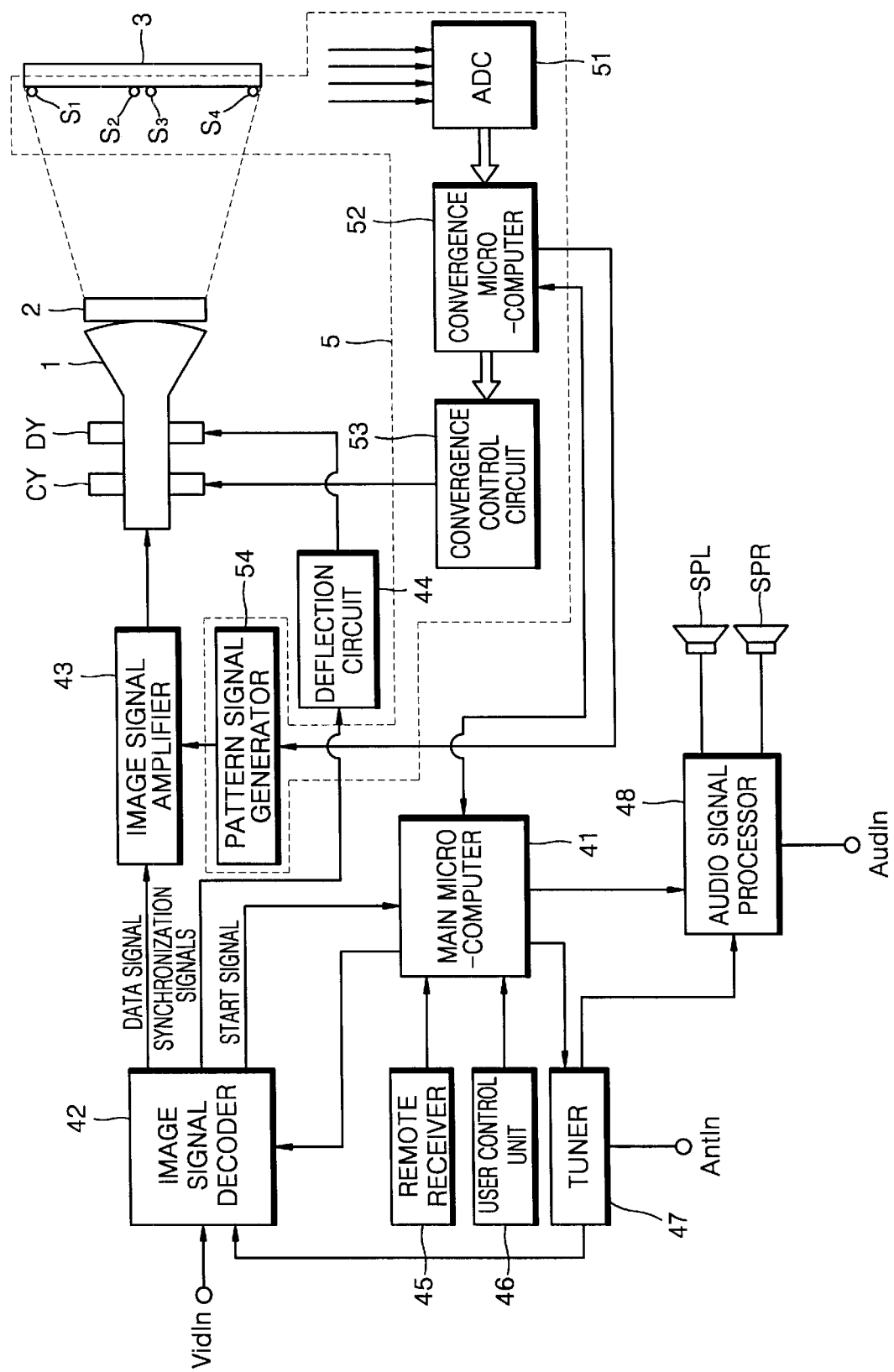
FIG. 1 is a block diagram showing the internal structure of a projection television including a convergence control apparatus according to a preferred embodiment of the present invention.
Figure 3:
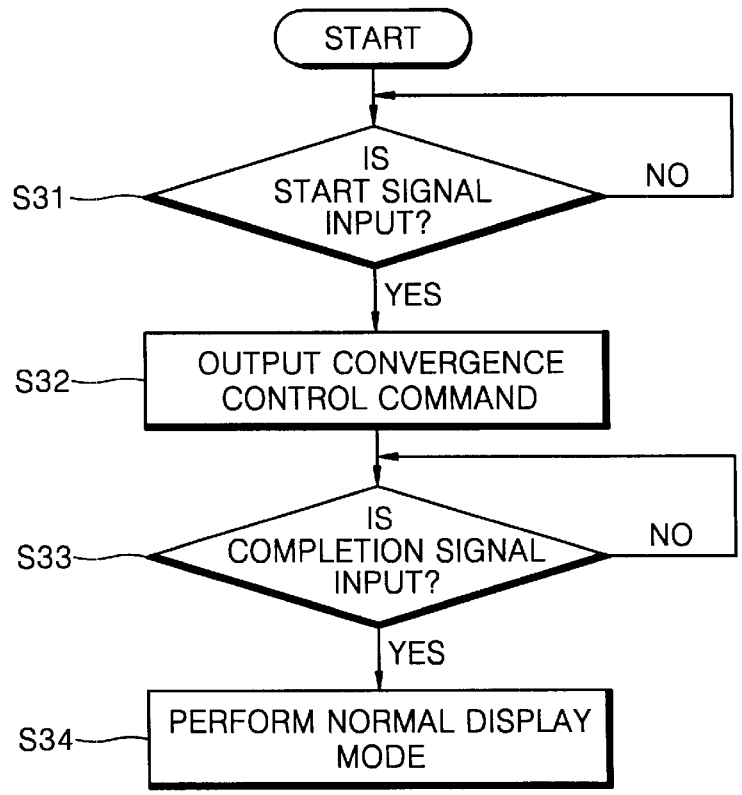
FIG. 3 is a flowchart illustrating the key algorithm of a main microcomputer of the projection television of FIG. 1.

The interior structure of a projection television including a convergence control apparatus according to a preferred embodiment of the present invention is shown in FIG. 1. A convergence control method according to the present invention can be applied to a projection television, which magnifies images displayed on cathode ray tubes (although only one cathode ray tube is illustrated in FIG. 1), for the colors red, green, and blue with respective lenses 2 and projects the images onto a screen 3. A flow chart of the method is shown in FIG. 3.

The convergence control method according to the present invention involves detecting the start of a synchronization signal of an input signal when a power voltage is applied to the projection television. Here, the input image signal refers to an image signal input to an image signal decoder 42 from an image signal input port VidIn or from a tuner 47. When the synchronization signal of the image signal is generated, a pattern signal generator 54 generates a predetermined convergence control pattern signal under control of a main microcomputer 41 and a convergence microcomputer 52. Next, convergence adjustment is conducted using the convergence control pattern signal, which will be described later in detail. After convergence adjustment is complete, the image signal is displayed.

By the convergence control method according to the present invention described above, convergence adjustment can be automatically conducted by detection of the start of the synchronization signal of an input image signal. Therefore, it is unnecessary for a user to adjust the convergence while watching the projection television.

The process of convergence adjustment using the convergence control pattern signal is as follows. Initially, the convergence control signal is input to the CRTs 1 through an image signal amplifier 43. Position signals of the images projected onto the screen 3 according to the convergence control pattern signal are detected by optical sensors $S_1$, $S_2$, $S_3$, or $S_4$. The detected position signals are converted into position data by an analog-to-digital converter (ADC) 51. The convergence microcomputer 52 and a convergence control circuit 53 adjust the quantity of current flowing through the convergence yoke (not shown) of each of CRTs 1.

Referring to FIG. 1, the projection television having the convergence control apparatus according to the present invention includes the image signal decoder 42, a convergence control unit 5, the main microcomputer 41, the image signal amplifier 43, a deflection circuit 44, a remote receiver 45, a user control unit 46, the tuner 47, an audio signal processor 48, and speakers SPL and SPR. Here, the image signal decoder 42, the convergence control unit 5, the main microcomputer 41, and the image signal amplifier 43 comprise the convergence control apparatus according to the present invention.

The image signal decoder 42 processes an input image signal to generate a data signal, horizontal and vertical synchronization signals, and a start signal indicating the start of either of the horizontal and vertical synchronization signals. Here, the input image signal refers to the image signal input to the image signal decoder 42 from the image signal input port VidIn or the tuner 47.

The convergence control unit 5 controls the convergence of the projection television according to a convergence control command input from the main microcomputer 41, and generates a completion signal after convergence adjustment is complete.

When the start signal is input from the image signal decoder 42, the main microcomputer 41 outputs a convergence control command to the convergence microcomputer 52 of the convergence control unit 5. When the completion signal is input from the convergence microcomputer 52, the main microcomputer 41 controls the image signal decoder, the tuner 47, and the audio signal processor 48 in accordance with a user control signal from the user control unit 46.

As described above, the start signal indicating the input of an image signal is generated by the image signal decoder 42 and, in response to the start signal, the convergence control command from the main microcomputer 41 is input to the convergence microcomputer 52 of the convergence control unit 5 for automatic convergence control. Accordingly, it is unnecessary for a user to adjust the convergence while watching television.

The deflection circuit 44 periodically controls the quantity of current flowing through the deflection yoke DY of each of the CRTs 1 in accordance with the horizontal and vertical synchronization signals from the image signal decoder 42.

The image signal amplifier 43 amplifies one of the data signal from the image signal decoder 42 and the convergence control pattern signal from the pattern signal generator 54 of the convergence control unit 5 and outputs the amplified signal to the CRTs 1. The output signal of the image signal amplifier 43 includes red, green, and blue signals. Each of the red, green, and blue signals is applied to a respective CRT 1 to control the amount of emission of electron beams of each color.

The convergence control unit 5 comprises the ADC 51, the convergence microcomputer 52, the convergence control circuit 53, the pattern signal generator 54, and the optical sensors $S_1$, $S_2$, $S_3$, and $S_4$.

The convergence microcomputer 52 generates a command to generate the convergence control pattern signal in response to the convergence control command from the main microcomputer 41 and generates control data corresponding to the position data of the convergence control pattern signal from the ADC 51. Upon receipt of the command to generate the convergence control pattern signal, the pattern signal generator 54 generates the convergence control pattern signal and outputs it to the image signal amplifier 43. The optical sensors $S_1$, $S_2$, $S_3$, and $S_4$ are located in predetermined positions of the screen 3 and generate position signals of the images projected according to the convergence control pattern signal. The ADC 51 converts the position signals from the optical sensors $S_1$, $S_2$, $S_3$, and $S_4$ to digital data and outputs the digital data as position data to the convergence microcomputer 52. The convergence control circuit 53 controls the quantity of current flowing through the convergence yoke CY of each of the CRTs 1 according to the control data from the convergence microcomputer 52.

The user control unit 46 generates a user control signal according to a user's direct manipulation and inputs the user control signal to the main microcomputer 411. The remote receiver 45 receives a transmission signal from a remote controller (not shown) manipulated by the user to generate a user control signal and inputs the generated user control signal to the main microcomputer 41.

The tuner 47 processes an antenna signal from an antenna input port AntIn to generate an image signal and an audio signal. The image signal from the tuner 47 is input to the image signal decoder 42, and the audio signal is input to the audio signal processor 48. The audio signal processor 48 processes the audio signals from the tuner 47 or the audio input port AntIn and outputs the processed audio signals through the speakers SPL and SPR.

Figure 2:
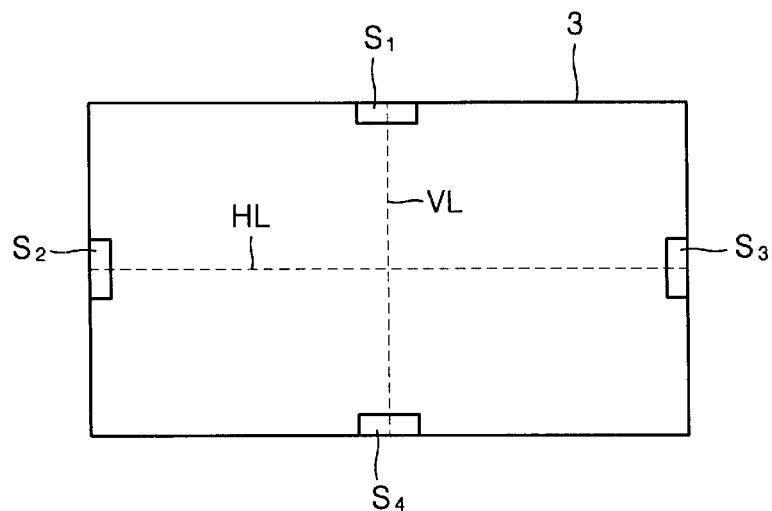
FIG. 2 is a rear plan view of a screen of the projection television shown in FIG. 1 to illustrate the locations of optical sensors.

FIG. 2 illustrates the positions of the optical sensors $S_1$, $S_2$, $S_3$, and $S_4$ in the rear of the screen 3 of the projection television shown in FIG. 1. Referring to FIG. 2, the four optical sensors $S_1$, $S_2$, $S_3$, and $S_4$ are located at the upper center, middle left, middle right, and lower center, respectively, of the screen 3. Therefore, the images are projected onto the screen 3 along horizontal and vertical center lines HL and VL, which each connects opposite optical sensors $S_1$, $S_2$, $S_3$, and $S_4$, according to the convergence control pattern signal from the pattern signal generator 54.

The key algorithm of the main microcomputer 41 of the projection television shown in FIG. 1 will be described with reference to FIGS. 1 and 3. If it is determined that the start signal is input from the image signal decoder 42, the main microcomputer 41 outputs a convergence control command to the convergence microcomputer 52 (step S32). The convergence microcomputer 52 controls the pattern signal generator 54 and the convergence control circuit 53 to adjust the convergence of the projection television. When a completion signal is input from the convergence microcomputer 52 (step S31), the main microcomputer 52 performs a normal display mode (step S34).

The key algorithm of the convergence microcomputer 52 of the projection television shown in FIG. 1 will be described with reference to FIGS. 1 and 4. When the convergence control command is input from the main microcomputer 41 (step S41), the convergence microcomputer 52 operates the pattern signal generator 54 (step S42). The images from the CRTs 1 and the lenses 2 are projected onto the screen 3 according to the pattern signal from the pattern signal generator 54. Next, the position data of the images are generated by the optical sensors $S_1$, $S_2$, $S_3$, and $S_4$ and the ADC 51 for convergence adjustment. When the position data is input from the ADC 51 (step S43), the convergence microcomputer 52 calculates a difference between the input position data and the reference data stored in its memory (step S44) and outputs control data based on the differences to the convergence control circuit 53 (step S45). The convergence control circuit 53 adjusts the quantity of current flowing across each convergence yoke CY of the CRTs 1 using the control data. Next, the convergence microcomputer 52 outputs the completion signal indicating that convergence adjustment is complete to the main microcomputer 41 (step S46). Accordingly, the main microcomputer 41 performs the normal display mode.

As described above, in the convergence control method and apparatus for a projection television according to the present invention, convergence adjustment can be automatically performed by detecting the start of a synchronization of an input image signal as a power voltage is applied to the projection television. Therefore, there is no need for a user to adjust the convergence while watching television.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A convergence control method for a projection television which magnifies images displayed on cathode ray tubes (CRTs) for the colors red, green, and blue with lenses and projects the images onto a screen, the method comprising:

when a power voltage is applied to the projection television, detecting the start of a synchronization signal of an input image signal;

when the start of the synchronization signal of the image signal is detected, generating a predetermined convergence control pattern signal;

adjusting the convergence of the projection television according to the predetermined convergence control pattern signal; and when convergence adjustment is complete, displaying the image signal.

2. The convergence control method of claim 1, wherein adjusting the convergence of the projection television comprises:

inputting the predetermined convergence control pattern signal to the CRTs;

detecting position data of the images projected onto the screen according to the predetermined convergence control pattern signal; and adjusting the quantity of current flowing through the convergence yoke of each of the CRTs according to the detected position data.

3. A convergence control apparatus for a projection television which magnifies images displayed on cathode ray tubes (CRTs) for the colors red, green, and blue with lenses and projects the images onto a screen, the apparatus comprising:

an image signal decoder which processes an input image signal and generates a data signal and horizontal and vertical synchronization signals, and a start signal indicating the start of either the horizontal and vertical synchronization signals;

a convergence control unit which performs convergence adjustment according to a convergence control command received by the convergence control unit, and generates a completion signal when convergence adjustment is complete; and a main microcomputer which inputs the convergence control command to the convergence control unit when the start signal is input from the image signal decoder, and performs a control operation to display the image signal when the completion signal is input from the convergence control unit.

4. The convergence control apparatus of claim 3, further comprising an image signal amplifier which amplifies one of the data signal from the image signal decoder and a predetermined convergence control pattern signal from the convergence control unit and outputs the amplified signals to the CRTs.

5. The convergence control apparatus of claim 4, wherein the convergence control unit comprises:

a convergence microcontroller which generates a command to generate the predetermined convergence control pattern signal according to the convergence control command from the main microcomputer and generates control data based on position data of the images projected onto the screen according to the predetermined convergence control pattern signal;

a pattern signal generator which generates the predetermined convergence control pattern signal in response to the command to generate the predetermined convergence control pattern signal, which is output from the convergence microcomputer, and inputs the predetermined convergence control pattern signal to the image signal amplifier;

optical sensors which are positioned at predetermined locations on the screen and generate position signals of the images projected according to the predetermined convergence control pattern signal;

an analog-to-digital converter which converts the position signals from the optical sensors into digital data and inputs the digital data as the position data to the convergence microcomputer; and a convergence control circuit which adjusts the quantity of current flowing through the convergence yoke of each of the CRTs according to the control data from the convergence microcomputer.

* * * * *